US006980491B2

(12) United States Patent
Shiratori et al.

(10) Patent No.: US 6,980,491 B2
(45) Date of Patent: Dec. 27, 2005

(54) DOMAIN WALL DISPLACEMENT TYPE MAGNETO-OPTICAL RECORDING MEDIUM AND RECORDING METHOD

(75) Inventors: Tsutomu Shiratori, Tokyo (JP); Katsumi Arisaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 10/419,856

(22) Filed: Apr. 22, 2003

(65) Prior Publication Data

US 2003/0203243 A1    Oct. 30, 2003

(30) Foreign Application Priority Data

Apr. 26, 2002  (JP)  .............................. 2002-126267

(51) Int. Cl.[7] .............................................. G11B 11/00
(52) U.S. Cl. .............................. 369/13.42; 369/13.47; 428/694 MM
(58) Field of Search .................... 369/13.42, 13.46, 369/13.45, 13.44, 13.54, 13.55, 275.4, 275.3, 369/13.47, 13.52, 13.06, 13.07, 13.08; 428/694 ML, 428/694 MM, 694 SC

(56) References Cited

U.S. PATENT DOCUMENTS

| | | | |
|---|---|---|---|
| 5,168,482 A | 12/1992 | Aratani et al. ................. 369/13 |
| 5,962,154 A | 10/1999 | Hashimoto et al. .. 428/694 ML |
| 6,027,825 A | 2/2000 | Shiratori et al. ..... 428/694 ML |
| 6,041,024 A * | 3/2000 | Ishii ......................... 369/13.47 |
| 6,150,038 A * | 11/2000 | Hirokane et al. ......... 369/13.42 |
| 6,197,440 B1 | 3/2001 | Shiratori ............... 428/694 SC |
| 6,249,489 B1 | 6/2001 | Fujii et al. ..................... 369/13 |
| 6,345,016 B1 | 2/2002 | Shiratori ................... 369/13.54 |
| 6,519,211 B1 * | 2/2003 | Murakami et al. ........ 369/13.08 |
| 6,572,957 B1 * | 6/2003 | Aratani ..................... 369/13.06 |
| 6,633,514 B1 * | 10/2003 | Awano et al. ............. 369/13.28 |
| 6,747,919 B2 * | 6/2004 | Kawaguchi et al. ...... 369/13.47 |
| 2003/0156502 A1 * | 8/2003 | Murakami et al. ........ 369/13.07 |
| 2004/0076110 A1 * | 4/2004 | Hino et al. ............... 369/275.3 |
| 2004/0218476 A1 * | 11/2004 | Ishibashi et al. .......... 369/13.06 |

FOREIGN PATENT DOCUMENTS

| | | |
|---|---|---|
| JP | 3-93058 | 4/1991 |
| JP | 6-290496 | 10/1994 |
| JP | 9-235885 | 9/1997 |
| JP | 2000-187898 | 7/2000 |

\* cited by examiner

*Primary Examiner*—Tan Dinh
(74) *Attorney, Agent, or Firm*—Fitzpatrick, Cella, Harper & Scinto

(57) ABSTRACT

There is provided a domain wall displacement type magneto-optical recording medium and a recording method that allow signals recorded with a high density over the limit of resolution of optical systems to be regenerated without increasing complexity of a recording and regenerating apparatus or narrowing an operation margin even if a substrate having address information or the like incorporated therein is used. An information track has portions used for recording and regenerating information in the form of a magneto-optical signal and portions having irregularities to provide address information or servo information formed therein alternately arranged, and directions of magnetization of the third magnetic layer are polarized in one direction above the portions having the irregularities.

2 Claims, 5 Drawing Sheets

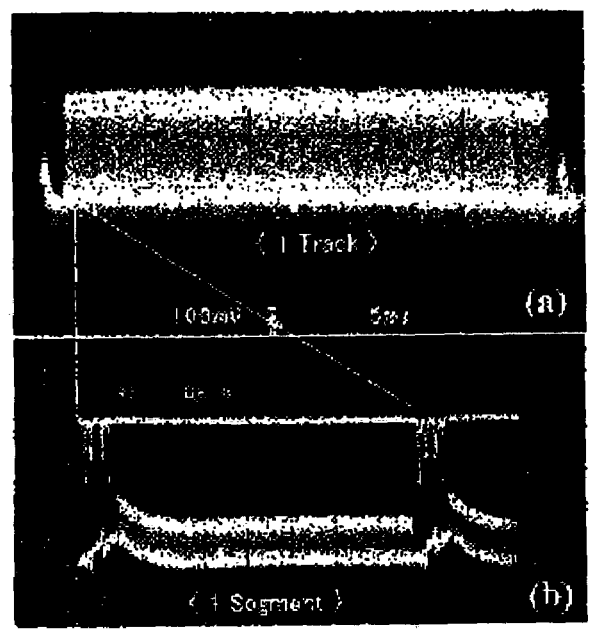
FIG. 1A
FIG. 1B
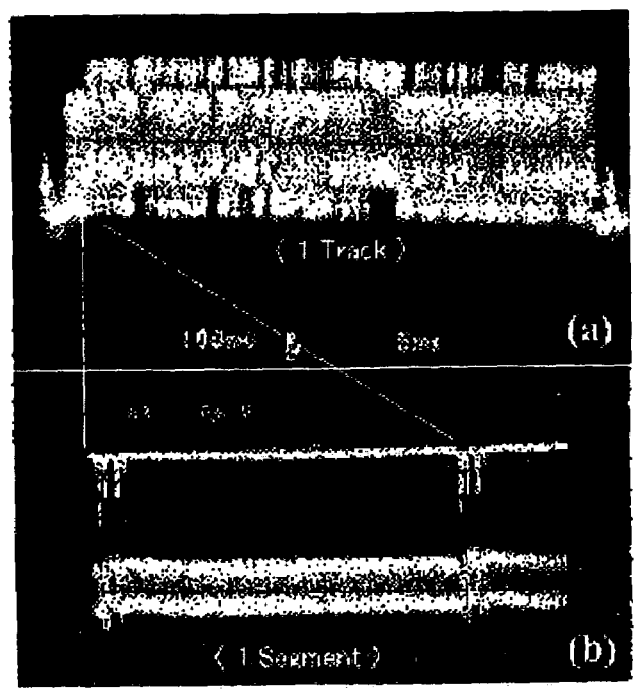
FIG. 2A
FIG. 2B

DOMAIN WALL DISPLACEMENT TYPE MAGNETO-OPTICAL RECORDING MEDIUM AND RECORDING METHOD

BACKGROUND OF THE INVENTION

1. Field of the Invention

The present invention relates to a magneto-optical recording medium for recording and regeneration of information through the use of a laser beam using a magneto-optical effect. More specifically, it relates to a magneto-optical recording medium that uses a magnetic domain wall displacement due to a temperature gradient and can regenerate signals recorded therein with a high density over the limit of resolution of optical systems.

2. Related Background Art

As rewritable recording media, various magnetic recording media have been put into practical use. In particular, magneto-optical recording media, which records information by forming a magnetic domain in a magnetic thin film using thermal energy from a semiconductor laser and regenerates the information using a magneto-optical effect, are promising mass commutative media capable of high-density recording. In recent years, in accordance with the trend toward digitization of moving picture, it has been required to increase the recording density of the magnetic recording media to provide a recording medium with a higher capacity.

In general, the track recording density of optical recording media significantly depends on a laser wavelength and a numerical aperture NA of an objective lens in a regenerating optical system. In other words, the laser wavelength $\lambda$ and the numerical aperture NA of the objective lens in the regenerating optical system determine the diameter of the beam waist. Thus, the spatial frequency of a recording pit that can regenerate a signal is limited to about $2NA/\lambda$. Therefore, for increasing the recording density of conventional optical disks, it is required to reduce the laser wavelength of the regenerating optical system or increase the numerical aperture of the objective lens. However, the laser wavelength is difficult to reduce in terms of efficiency and heat generation of the element, and if the numerical aperture of the objective lens is increased, more severe mechanical precision becomes required because of reduction of the focal depth or the like.

Thus, various super resolution techniques have been developed which are improved in configuration of the recording medium and method of regenerating information and provide improved recording density without changing the laser wavelength and the numerical aperture of the objective lens. For example, in Japanese Patent Laid-Open No. 3-93058, there has been proposed a signal regenerating method in which a signal is recorded in a multilayer recording layer comprising a regenerating sub-layer and a recording sub-layer magnetically coupled to each other, the directions of magnetization of the regenerating sub-layer are aligned before the regenerating sub-layer is irradiated with laser light to be heated, and then the signal recorded in the recording sub-layer is read out by being transferred to a region of the regenerating sub-layer in which the temperature has been increased. According to this method, since the signal detection region can be limited within a desired region in which the temperature is increased, which is smaller than the regenerating spot, an intersymbol interference during regeneration of information can be reduced, and a signal of a spatial frequency equal to or higher than $2NA/\lambda$ can be regenerated. However, this method has a disadvantage that, since the available signal detection region is smaller than the spot of the regenerating laser, the amplitude of the regenerated signal is reduced, the resulting output power of regeneration is insufficient. Therefore, the available signal detection region cannot be significantly smaller than the spot size. Consequently, the recording density cannot be significantly increased compared to that determined by the diffraction limited of the optical system.

In view of such a problem, in Japanese Patent Application Laid-Open No. 6-290496, the present inventors have already proposed a magnetic recording medium and regenerating method in which a magnetic domain wall located at a boundary of a recording mark is displaced due to a temperature gradient toward a side of higher temperature, and the domain wall displacement is detected, whereby signals recorded therein with a high density over the limit of resolution of optical systems can be regenerated without reducing the amplitude of the regenerated signals.

In method described in Japanese Patent Application Laid-Open No. 6-290496, if the temperature gradient is to be provided by heating the medium using the regenerating light beam itself, the peak of the temperature distribution appears in the regenerating light beam spot. Accordingly, in a region having a temperature that allows the domain wall to be displaced, a domain wall displacement from a front end of the region and a domain wall displacement from a rear end of the region are both read out by the regenerating spot, and a satisfactory regenerated signal cannot be obtained. Thus, besides the regenerating light beam, it is required to additionally provide means for providing a desired temperature distribution. Therefore, there is a problem that the regenerating apparatus becomes more complicated. Furthermore, in Japanese Patent Application Laid-Open No. 9-235885, there has been proposed a method in which the domain wall displacement from the rear end is suppressed by applying a regenerating magnetic field. However, this method has a problem that a margin of the regenerating magnetic field that provide a satisfactory regenerated signal is narrow, and the resulting signal waveform is asymmetrical.

Furthermore, in Japanese Patent Application Laid-Open No. 2000-187898, there has been proposed a method in which the domain wall displacement from the rear end is suppressed by inserting a magnetic layer having a high domain wall energy density (control layer) to control a transfer condition in the rear part of the temperature distribution. This method has completely solved the above-described problem regarding essential operations. However, it is proved that, if a pit portion having irregularities for providing address information or servo information is provided on the substrate, controllability of the transfer condition or the like is lost due to a variation of deposition of a magnetic film onto the portion or the like, and thus, the domain wall is easily displaced from the rear end in the portion. That is, after the regenerating spot passes over the pit portion, the direction of magnetization of the portion behind the regenerating spot is inverted, and the regenerated signal largely varies in a DC manner. This phenomenon causes an edge shift of the regenerated signal and becomes a problem in assuring a margin for regenerating information or increasing the recording density.

SUMMARY OF THE INVENTION

The present invention is to provide a magneto-optical recording medium and a recording method that allow signals recorded with a high density over the limit of resolution of optical systems to be regenerated without making the recording and regeneration apparatus complicated and narrowing an operation margin. As employed herein the term "regenerate" and its derivatives as "regenerated", "regenerating" and "regeneration", means to "reproduce" as in "reproducing information."

A magneto-optical recording medium according to the present invention is a magneto-optical recording medium having a plurality of information tracks, comprising: a substrate, each of the information tracks having portions used for recording and regenerating information in the form of a magneto-optical signal and portions having prepits (irregularities) formed therein alternately arranged; and at least first, second and third magnetic layers laminated on the substrate, in which the first magnetic layer has a domain wall coercivity smaller than that of the third magnetic layer, the second magnetic layer has a Curie temperature lower than that of the first and third magnetic layers, and directions of magnetization of the third magnetic layer are aligned above the portions having the irregularities.

Furthermore, a recording method according to the present invention is a method of recording information on a magneto-optical recording medium, the magneto-optical recording medium comprising a substrate having information tracks each having portions used for recording and regenerating information in the form of a magneto-optical signal and portions having prepits (irregularities) formed therein alternately arranged and at least first, second and third magnetic layers laminated on the substrate, the first magnetic layer having a domain wall coercivity smaller than that of the third magnetic layer, the second magnetic layer having a Curie temperature lower than that of the first and third magnetic layers, and directions of magnetization of the third magnetic layer being aligned above the portions having the irregularities, the method comprising the steps of:

applying a magnetic field to the portions used for recording and regeneration while irradiating the same with a light beam with a magnetic head to record information on the portions; and applying a DC magnetic field to the portions having the pepits with the magnetic field while irradiating the portions with the light beam to align the directions of magnetization of the third magnetic layer above the portions., Detailed description will be made later with reference to examples.

BRIEF DESCRIPTION OF THE DRAWINGS

FIGS. 1A and 1B show waveforms of regenerated signals for a sample in Example 1, observed with an oscilloscope, FIG. 1A showing an envelope for a round of track, and FIG. 1B showing an envelope for one segment obtained by enlarging the envelope in FIG. 1A along a time base through a 50 kHz HPF, in which the upper waveform is of a sum signal regenerated from a clock pit, a first wobble pit for servo, a second wobble pit and an address pit, and the lower waveform is of a differential signal obtained by regenerating the magneto-optically recorded signal.

FIGS. 2A and 2B show waveforms of regenerated signals for a sample in Comparison Example 1, observed with the oscilloscope, FIG. 2A showing an envelope for a round of track, and FIG. 2B showing an envelope for one segment obtained by enlarging the envelope in FIG. 2A along a time base through a 50 kHz HPF, in which the upper waveform is of a sum signal regenerated from a clock pit, a first wobble pit for servo, a second wobble pit and an address pit, and the lower waveform is of a differential signal obtained by regenerating the magneto-optically recorded signal.

DETAILED DESCRIPTION OF THE PREFERRED EMBODIMENTS

Figure 3:
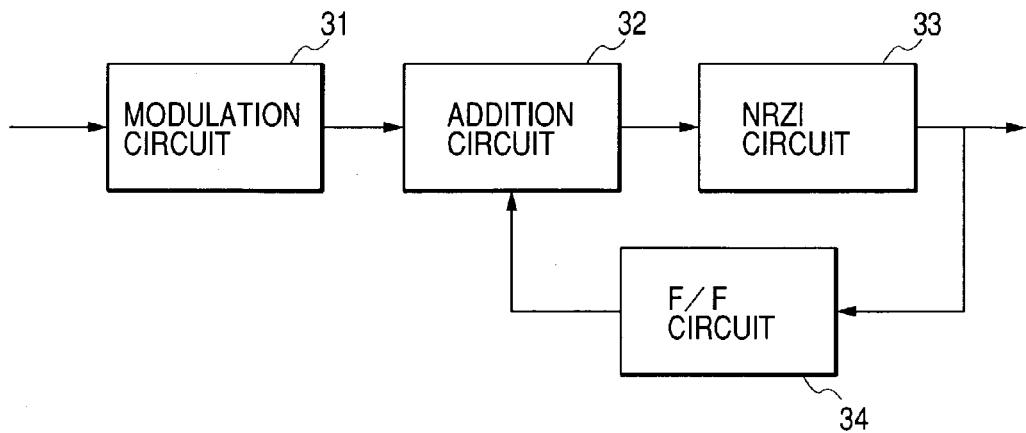
FIG. 3 is a circuit block diagram for implementing the present invention.

A magneto-optical recording medium according to the present invention comprises a substrate having an information track having portions used for recording and regenerating information in the form of an magneto-optical signal and portions having prepits (irregularities) for providing address information or servo information alternately arranged, and at least first, second and third magnetic layers laminated one on another on the substrate, in which the first magnetic layer has a coercivity of the domain wall lower than that of the third magnetic layer, the second magnetic layer has a Curie temperature lower than those of the first and third magnetic layer, and directions of magnetization of the third magnetic layer are aligned above the portion having irregularities.

In addition, a recording method according to the present invention is to record information on the magneto-optical recording medium described above, in which the magneto-optical recording medium is irradiated with a light beam, and at the same time, a DC magnetic field is applied thereto from a magnetic head, thereby recording information thereon with the directions of magnetization of the third magnetic layer above the portions having the prepits (irregularities) being aligned.

Deposition of a magnetic film onto the portions having the prepits (referred to as irregularities, hereinafter) is different from that onto the portions used for recording and regenerating information. The film deposition onto the portions having the irregularities is affected by the irregularities, and thus, the anisotropy or film thickness is reduced. Thus, magnetization transfer readily occurs, and the domain wall is readily displaced. Accordingly, if magnetization of the first magnetic layer behind the regenerating spot is directed in an astable direction with respect to the direction of magnetization of the third magnetic layer when a regenerating spot passes thorough a portion having irregularities, the magnetization state of the third magnetic layer is transferred to the first magnetic layer, and the domain wall is displaced so as to expand the magnetization state. As a result, magnetization of the first magnetic layer behind the regenerating spot is directed in a stable direction with respect to the direction of magnetization of the third magnetic layer. To the contrary, if magnetization of the first magnetic layer behind the regenerating spot is directed in a stable direction with respect to the direction of magnetization of the third magnetic layer when the regenerating spot passes thorough the portion having irregularities, no change occurs. Accordingly, above the following portion used for recording and regenerating information in the form of a magneto-optical signal, magnetization of the first magnetic layer behind the regenerating spot is directed in a stable direction with respect to the direction of magnetization of the third magnetic layer above the portion having irregularities.

Therefore, if only directions of magnetization of the third magnetic layer is aligned at least in all areas immediately preceding the portions used for recording and regenerating information in the form of a magneto-optical signal of the portions having the irregularities directions of magnetization of the first magnetic layer behind the regenerating spot can be aligned in all the portions used for recording and regenerating information in the form of a magneto-optical signal.

On a substrate having irregularities for providing address information or the like, a base layer, a first magnetic layer, a fourth magnetic layer, a second magnetic layer, a third magnetic layer and a top layer are stacked one on another. The substrate may be made of polycarbonate, acrylic resin, glass or the like. If recording or regeneration of information is not conducted through the substrate, the substrate need not be a translucent material. The base layer and top layer may be made of a dielectric material, such as SiN, AiN, SiO, ZnS, MgF and TaO. The layers other than the magnetic layers are not essential. The order of the magnetic layers stacked may be reversed. A metal layer made of Al, AlTa, AlTi, AlCr, Cu, Pt, Au or the like may be added to this arrangement to control the thermal characteristics thereof. In addition, a protective coating made of a polymer resin may be added thereto. Alternatively, substrates after film deposition may be bonded together.

Each of the layers may be deposited by successive sputtering by means of a magnetron sputtering apparatus, successive evaporation or the like. In particular, the magnetic layers are successively deposited while maintaining a vacuum state and thus, are exchange-coupled to each other.

In the medium described above, each of the magnetic layers may be made of various magnetic materials including magnetic bubble materials and antiferromagnetic materials, as well as materials typically used for magnetic recording media or magneto-optical recording media.

For example, the magnetic layers may be made of an amorphous rare-earth iron group alloy containing 10 to 40 atomic % of one or more rare-earth metals including Pr, Nd, Sm, Eu, Gd, Tb, Dy, Ho and Er and 90 to 60 atomic % of one or more iron group elements including Fe, Co and Ni. Furthermore, in order to enhance corrosion resistance, a small amount of an element such as Cr, Mn, Cu, Ti, Al, Si, Pt or In may be added to the alloy.

Furthermore, a platinum-group iron-group periodic structure film such as Pt/Co and Pd/Co, a platinum-group iron-group alloy film, an antiferromagnetic material such as Co—Ni—O and Fe—Rh based alloys, or a magnetic garnet may be used.

The saturation magnetization of heavy-rare-earth iron-group amorphous alloys can be controlled by changing the composition ratio between the rare-earth element and the iron-group element. A compensation composition can provide a saturation magnetization of 0 emu/cc at a room temperature.

The Curie temperature also can be controlled by changing the composition ratio. If the Curie temperature is to be controlled independently of the saturation magnetization, a method may preferably be used in which some of the Fe atoms, an iron-group element, are replaced with Co atoms, and the amount of the Fe elements replaced is controlled. Specifically, if 1 atomic % of Fe is replaced with Co, the Curie temperature is expected to increase by about 6 degrees C. Thus, according to this relation, the amount of added Co is adjusted to provide a desired Curie temperature. Alternatively, a small amount of a nonmagnetic element, such as Cr, Ti and Al, may be added to reduce the Curie temperature. Alternatively, two or more rare-earth elements may be used, and the composition ratio therebetween may be controlled to control the Curie temperature.

Domain wall coercivity and domain wall energy density are mainly controlled by selecting material element, and furthermore can be controlled by condition of the base layer or film formation conditions such as sputtering gas pressure or the like. A material such as Tb and Dy has high domain wall coercivity and domain wall energy density. A material such as Gd has a low domain wall coercivity and domain wall energy density. Control can be also conducted by addition of impulities or the like.

The film thickness can be controlled based on the film deposition speed and film deposition time.

Recording of a data signal onto the magneto-optical recording medium of the present invention is conducted by associating the direction of magnetization of the third magnetic layer with the data signal according to a thermomagnetic recording method. The thermomagnetic recording method includes a method of modulating an external magnetic field in response to the data signal by irradiating the recording medium with laser light having a power that provides the third magnetic layer with a temperature equal to or higher than the Curie temperature while moving the medium, and a method of modulating the power of the laser while applying a magnetic field in a certain direction to the recording medium. In the case of the latter, if the intensity of the laser light is adjusted in such a manner that a temperature equal to or higher than the Curie temperature of the third magnetic layer is attained only in a predetermined area in the light spot, a recording magnetic domain smaller than the diameter of the light spot can be formed, and thus, a high-density recording pattern over the limit of the resolution of the optical system can be provided.

The present invention will be described in detail below with reference to specific examples. However, the present invention is not limited to the following examples without departing from the spirit thereof.

EXAMPLE 1

In this example, a sample servo method was used and a substrate described below was prepared. In the substrate, a round of track is divided into 1280 segments, and each segment includes a leading portion in which a clock pit, a first wobble pit for servo, a second wobble pit and an Address pit are formed in this order in the form of irregularities and a trailing portion which is a data area used for recording and regenerating information in the form of a magneto-optical signal.

In a direct-current magnetron sputtering apparatus, targets of B-doped Si, Gd, Tb, Fe, Co and Cr were installed, the substrate was fixed to a substrate holder, and then, the chamber was evacuated with a cryopump until a high vacuum of $1 \times 10^{-5}$ Pa or lower is attained in the chamber. Then, an Ar gas was introduced into the chamber until a pressure of 0.5 Pa is attained while conducting evacuation, and the targets were sputtered while rotating the substrate, thereby forming the respective layers. When forming an SiN layer, an $N_2$ gas was introduced in addition to the Ar gas, and the SiN layer was formed by direct-current reactive sputtering.

Figure 7:
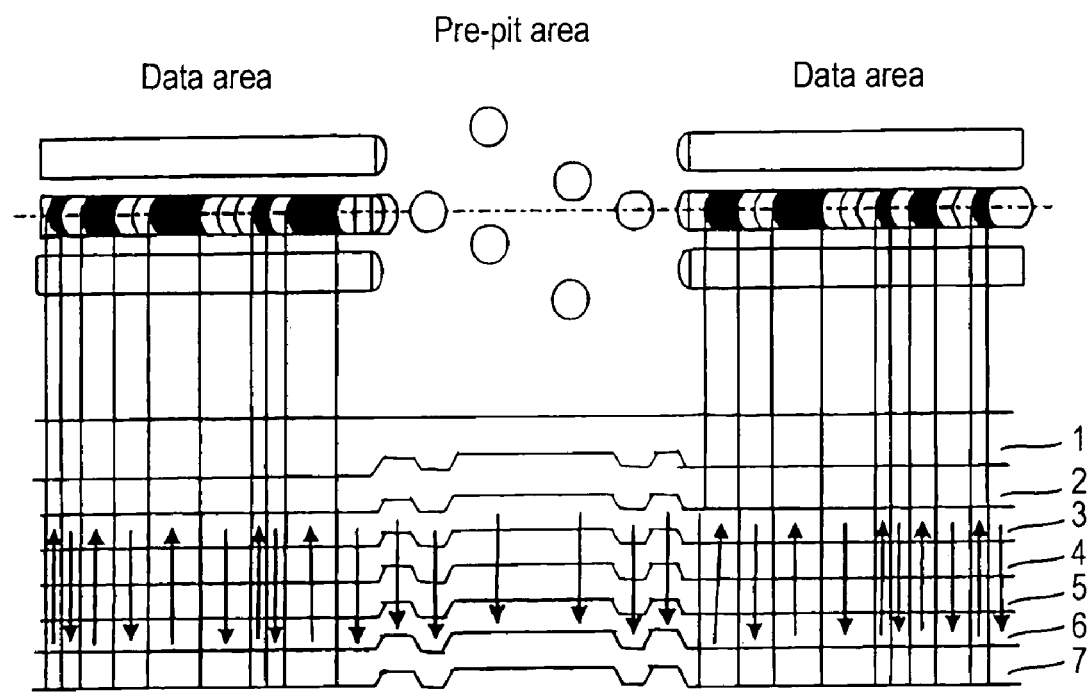
FIG. 7 illustrates recording and reproducing of information on the magneto-optical recording medium of Example 1.

First, as shown in FIG. 7 the SiN layer, which is the base layer 2, was deposited on substrate 1 to a thickness of 35 nm. Then a GdFeCoCr layer, which is the first magnetic layer 3

(domain wall displacement layer), was deposited to a thickness of 35 nm, a TbFeCoCr layer, which is the fourth magnetic layer 4 (adjustment layer), was deposited to a thickness of 15 nm, a TbFeCr layer, which is the second magnetic layer 5 (blocking layer), was deposited to a thickness of 10 nm, and a TbFeCoCr layer, which is the third magnetic layer 6 (memory layer), was deposited to a thickness of 60 nm. Finally, a SiN layer serving as a protective layer 7 was deposited to a thickness of 50 nm.

The composition ratio of each of the magnetic layers was controlled by controlling the ratio of powers applied to the targets of Gd, Tb, Fe, Co and Cr. The composition ratio of each of the magnetic layers was adjusted to generally approximate to the compensation composition.

The first magnetic layer comprised a first constituent sub-layer having a Curie temperature of about 300 degrees C., which is closer to the base layer, and a second constituent sub-layer having a Curie temperature of about 220 degrees C. The Curie temperatures of the fourth, second and third magnetic layers were adjusted to be about 180 degrees C., 160 degrees C. and 320 degrees C., respectively.

At a room temperature, the domain wall coercivity of the first magnetic layer was about 500 Oe, and the domain wall coercivity of the third magnetic layer was equal to or higher than 15 kOe. The domain wall energy density of the first magnetic layer was about 2 erg/cm$^2$, and the domain wall energy density of the fourth magnetic layer was about 4 erg/cm$^2$.

The magnetic film of the medium between the information tracks was locally and selectively laser-annealed from the side of the film surface using a drive apparatus having mounted thereon a three-beam optical system with a wavelength of 405 nm and a NA of 0.85, with a linear velocity of 3 m/sec and an LD power of 6.0 mW. By this processing, coupling due to exchange interaction along the surface of the magnetic layer is reduced in areas on both sides of the information track.

After that, an ultraviolet curing resin layer having a thickness of about 15 µm was formed on the film surface, thereby providing a sample of the magneto-optical recording medium of the present invention.

Then, recording and regeneration of information onto this sample was conducted using an optical system with a wavelength of 650 nm and an NA of 0.60 and a magneto-optical disk evaluation apparatus having a magnetic head for magnetic field modulation recording. The sample was rotated at a linear velocity of 3 m/sec and direct-current-irradiated with a recording/regenerating laser of a power of 4.5 mW, and the magnetic field was modulated between intensities of ±200 Oe at a recording frequency 10 MHz. Thereby, a signal pattern of an upward magnetization region and a downward magnetization region having a mark length of 0.15 µm was formed in the data area during a cooling process after heating to or above the Curie temperature of the third magnetic layer.

In this processing, when the laser passes through the leading portion of each segment in which the irregularities of the clock pit, the wobble pit and the address pit are formed, the laser was kept being applied thereto, and the magnetic field was fixed at −200 Oe. Due to this operation, directions of magnetization of the third magnetic layer above the portions having the irregularities were aligned in whole of the recording track, and a magneto-optical recording medium meeting the requirements of the present invention was provided.

COMPARISON EXAMPLE 1

Recording onto the sample described above was conducted in a similar manner. However, even when the laser passes through the leading portions having irregularities of the segments, the magnetic field was continuously modulated, and as a result, the directions of magnetization of the third magnetic layer above the portions were not aligned.

Results of observation, with an oscilloscope, of waveforms regenerated with a regeneration power of 2.5 mW for the samples of Example 1 and Comparison Example 1 are shown in FIGS. 1A, 1B, 2A and 2B, respectively. FIGS. 1A and 2A show an envelope for a round of track, and FIGS. 1B and 2B show an envelope for one segment obtained by enlarging the envelope in FIGS. 1A and 2A, respectively, along a time base through a 50 kHz HPF. In FIGS. 1B and 2B, a sum signal regenerated from the clock pit, the first wobble pit for servo, the second wobble pit and the address pit in the leading portion of the segment is also shown above a differential signal obtained by regenerating the magneto-optically recorded signal.

In Example 1, as shown in FIG. 1B, the magneto-optical signals for the leading portion having irregularities of each segment are aligned in a certain direction (downwardly, in this case), and the following data area is regenerated with the directions of magnetization of the first magnetic layer behind the regenerating spot being aligned for the segments. As a result, a stable envelope is observed as shown in FIG. 1A without a variation of the envelope among the segments.

To the contrary, in Comparison Example 1, a high-frequency magneto-optical signal pattern is recorded also for the leading portion having irregularities of each segment as shown in FIG. 2B. In such a case, directions of magnetization of the third magnetic layer are not aligned in a part where the anisotropy or thickness is reduced due to an effect of the irregularities. Accordingly, the signal in the following data area is regenerated with the directions of magnetization of the first magnetic layer behind the regenerating spot being varied among the segments. As a result, the envelope is varied among the segments as shown in FIG. 2A.

Such low-frequency variation of the signal waveform can be apparently suppressed by means of the HPF. However, in such a case, the directions of magnetization of the first magnetic layer behind the regenerating spot are actually varied, and an edge shift of the regenerated signal is caused by an effect of a floating magnetic field or the like, and the jitter is increased. The jitter was measured for both cases using the 50 kHz HPF. Then, the jitter was 2.6 nsec for the medium of Example 1, while the jitter was 3.2 nsec for the medium of Comparison Example 1.

EXAMPLE 2

As can be seen from FIG. 1B, the envelope of the signal regenerated through the 50 kHz HPF has a sag due to an effect of the preceding DC signal immediately after entering the data area. Such a sag is not significant if the signal is detected according to a differential detection method. However, the sag is not desirable because it results in an increased apparent signal amplitude, and thus, a dynamic range becomes needed in the circuit.

In order to suppress the sag described above, for the entire recording tracks, the directions of magnetization of the third magnetic layer can be aligned only in parts, immediately preceding the data area, of the portions having the irregularities for providing the address information and servo information, and a predetermined signal pattern falling within a signal bandwidth used for recording and regenerating information can be recorded in the remaining parts of the portions having the irregularities. This can significantly reduce the length of the parts in which magnetization has to be DC-directed, and thus the sag can be suppressed.

However, while according to the format of the substrate used in Example 1, the address pit is arranged immediately preceding the data area, the address pit is difficult to handle since the presence or absence thereof or the position thereof varies from segment to segment for providing the address information. Thus, in this example, a substrate was used in which the clock pit, the address pit, the first wobble pit for servo and the second wobble pit are formed in this order.

In addition, in Example 1, there has been contemplated a case where controllability of transfer suppression and domain wall displacement prevention is maintained in some areas in the portions having the irregularities, and the direction of magnetization of the first magnetic layer behind the regenerating spot is not always transferred to the third magnetic layer. Thus, the directions of magnetization of the third magnetic layer were aligned in all the areas where the controllability of transfer suppression and domain wall displacement prevention might be lost, so that even if the magnetization state is transferred, the direction of the first magnetic layer behind the regenerating spot was kept constant. The irregularities may not significantly affect the deposition of the film depending on depths or shapes thereof, and thus, the condition of the magnetic film above the portions having the irregularities becomes critical, resulting in such a local variation.

However, in this example, when magnetization of the first magnetic layer is inverted above the part of the portion having irregularities for which the direction of magnetization of the third magnetic layer is not controlled, the data area must not be entered before inverting again the magnetization of the rearmost part of the portion having irregularities, for which the direction of magnetization of the third magnetic layer is controlled. Thus, the irregularities were formed deeper and steeper than those in Example 1 to ensure that the direction of magnetization of the first magnetic layer behind the regenerating spot is transferred to the third magnetic layer at least in the rearmost part of the portion having the irregularities in which the direction is controlled.

Figure 8:
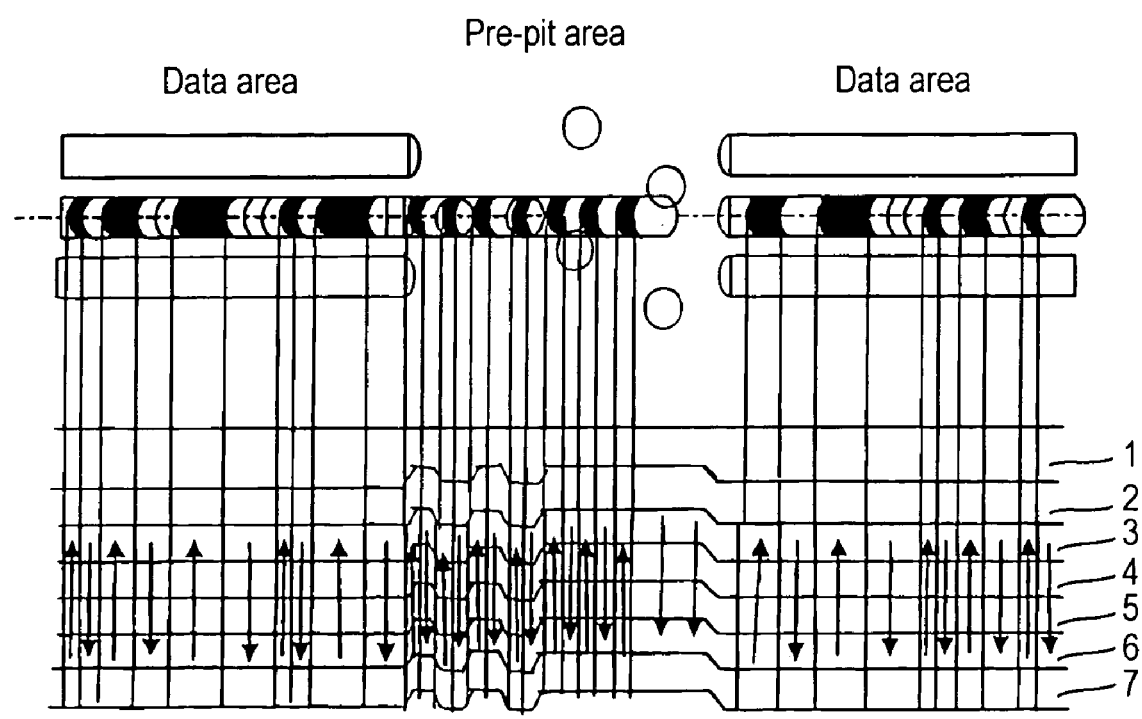
FIG. 8 illustrates recording and reproducing information on the magneto-optical recording medium of Example 2.

A sample was fabricated using this substrate in the same manner as in Example 1. This is illustrated in FIG. 8. Each layer 1–7 in FIG. 8 corresponds to the same layer in FIG. 7 as identified by numerals 1–7. Then, except for the part having the second wobble pit in each segment, which was polarized over 0.6 $\mu$m in one direction, a signal pattern having a mark length of 0.15 $\mu$m was recorded in whole of the track.

Regeneration of information from the sample according to Example 2 was conducted in the same manner as in Example 1, and the regeneration waveform was observed with the oscilloscope. As a result, any variation of the envelope among segments did not occur, and the envelope of the signal regenerated involving the 50 kHz HPF had no sag in the data area.

This example has an advantage that, even if the direction of magnetization of the first magnetic layer behind the regenerating spot is inverted due to a defect in the film, such as dust or scratch, an appropriate direction of magnetization can be recovered in the following segment.

EXAMPLE 3

Now, a method of magnetizing the leading portion of each segment having the irregularities of the clock pit, the wobble pit and the address pit in one direction when recording actual user data will be described with reference to FIG. 3.

First, the user data output from a buffer (not shown), which temporarily retains data, is modulated by a modulation circuit 31 in accordance with RLL (1, 7). RLL (1, 7) is a modulation rule in which the run length of bit "1" is always 1 channel clock and the run length of bit "0" ranges from 1 to 7. To the modulated data, a SYNC signal or the like is added in an addition circuit 32 in the next stage. The added signal is needed to provide clock extraction and byte synchronization during regeneration. Then, the output from the addition circuit 32 is transmitted to an NRZI circuit 33, which outputs a signal which is inverted only when it is the bit "1". This output is transmitted to a magnetic head driver, and a magnetic head (not shown) produces a positive or negative magnetic field depending on whether the signal is 1 or 0. Furthermore, the output from the NRZI circuit 33 is latched in an F/F circuit 34 at an appropriate timing and returned to the addition circuit 32.

Figure 4:
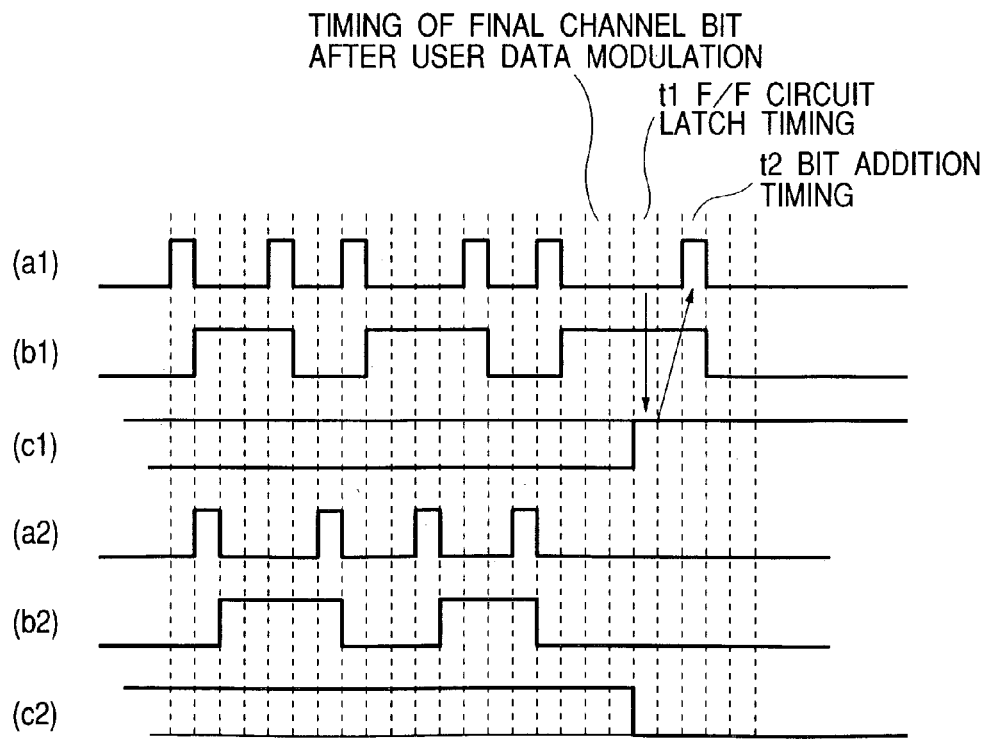
FIG. 4 is a signal waveform diagram for illustrating operations of the circuit blocks.

Here, an operation of each of the blocks shown in FIG. 3 will be described with reference to the timing chart in FIG. 4, which illustrates output signals of the blocks. In FIG. 4, signals (a1) and (a2) are the outputs of the addition circuit 32, signals (b1) and (b2) are the outputs of the NRZI circuit 33, and signals (c1) and (c2) are the outputs of the F/F circuit.

Since the user data is essentially random data, whether the number of HIGH pulses in the user data of each segment is even or odd is not fixed. Thus, in the case where the number of the HIGH pulses in the user data of a relevant segment is odd, the value after the NRZI is 1 when the segment is ended as shown as the signal (b1), even if the value is 0 when the preceding segment is ended. Thus, in the signal (b1), the value immediately after the user data is latched at a timing t1. Based on the resulting signal (c1), the addition circuit adds a value 0 or 1 to the output data at a timing t2. In this case, a value 1 is added. After the addition, the addition circuit keeps outputting the value "0" during a period corresponding to the leading portion having irregularities of the following segment. Therefore, the output of the NRZI circuit is kept at 0 without being changed.

The case where the number of the HIGH pulses is even is as shown as the signals (a2), (b2) and (c2). In the case whether the number is even, after the value 0 is added to the output data, the addition circuit keeps outputting the value "0" during a period corresponding to the leading portion having irregularities of the following segment.

These timings can be generated by a recorded signal timing circuit counting channel clocks from the end of the user data.

Figure 5:
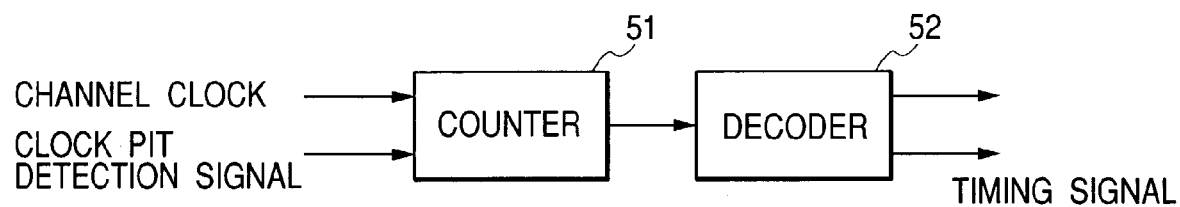
FIG. 5 shows a recorded signal timing circuit.

The channel clock is regenerated by a PLL circuit, not shown. The PLL circuit serves to keep an interval between clock pits at a certain count value based on detection signals of the clock pits. FIG. 5 specifically shows the recorded signal timing circuit. As shown in FIG. 5, the recorded signal timing circuit comprises a counter 51 that counts channel clocks when recording information and is reset by a clock pit detection signal, and a circuit 52 for decoding the count output.

Figure 6:
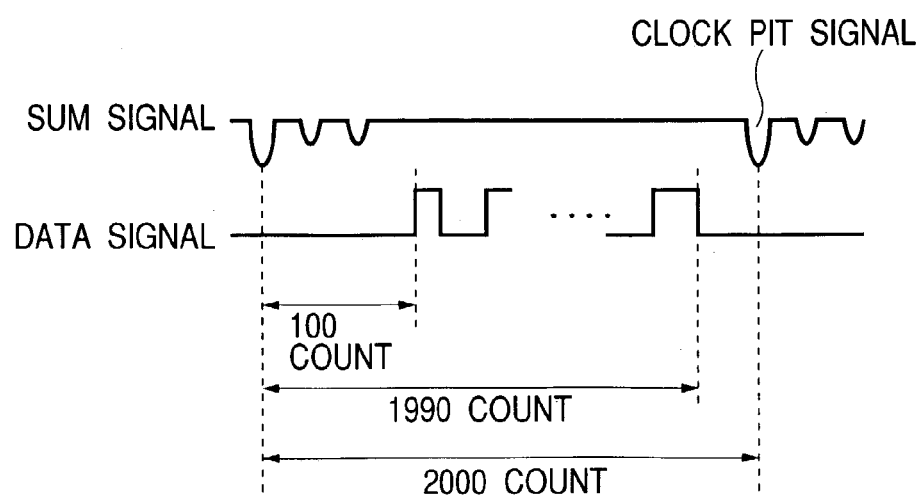
FIG. 6 is a diagram for illustrating an operation of the recorded signal timing circuit.

FIG. 6 is a timing chart showing a relation between a sum signal for the leading portion of each segment and a timing of recording data. The operation of the recorded signal timing circuit will be described with reference to FIG. 6. In this example, the clock count between the clock pits is 2000. The counter 51 sequentially counts clocks from a point of a clock pit detection signal where the count value is set at 0. The decoder outputs a timing signal of a data start at the HIGH level only when the count value reaches 100, which is beyond the leading portion having the irregularities of each segment. This output is transmitted to the modulation circuit 31 shown in FIG. 3, causing the circuit to start modulation.

The same holds true for the timing of data end. As for the number of pieces of data in each segment, the data length is set in such a manner that the timing of data end is reached before the leading portion having the irregularities of the following segment arrives. With the clock count set value being 1990, the decoder 52 outputs "HIGH" only when the count value output from the counter 51 reaches 1990. This output is provided to the addition circuit 32 as a timing of the last channel bit after user data modulation. Based on this output, the above-described timings t1 and t2 are generated, and the above-described operations are implemented. In this example, the leading portion having the irregularities of each segment has a size corresponding to 110 clocks, 10 clocks of which preceding the Clock pit and 100 clocks of which following the Clock pit.

As a result, regardless of the content of the user data, the output level for the leading pit portion of each segment is kept at 0. Thus, when the signal is recorded onto the medium with the magnetic head, magnetization is always the same for the pit portions.

Of course, the present invention is not applied only to the modulation rule and the signal processing method, such as NRZI, described above. It is essential only that whether the signal to be output to the magnetic head, that is, the digital signal output to the magnetic head driver is 1 or 0 is determined, a part of the output data can be varied in response to the detected value, and thus, the digital signal is always fixed to either value during the period corresponding to the pit portion.

Besides Examples described above, various applications of the magneto-optical recording medium of the present invention can be contemplated. The present invention can be effectively applied not only to the sample servo method, but also to a case where a substrate having a continuous groove based on a push-pull method is used, if the information track has features that have an effect on deposition of the film, such as irregularities for providing the address information. The same holds true for a case where the information track has a break in a groove, or land or the like, instead of the pits.

In Examples described above, the fourth magnetic layer serving as a control layer is inserted. However, the fourth magnetic layer is not necessarily required to be inserted if the information is recorded in accordance with a modulation method in which the mark length is limited to about 0.3 $\mu$m, for example.

In Examples described above, the first magnetic layer comprises the first and second sub-layers different in Curie temperature. However, if the composition is precisely controlled, the first magnetic layer can be composed of a single layer.

In Examples described above, the areas on both sides of the information tracks are laser-annealed to reduce coupling between the information tracks due to exchange interaction of the magnetic layer. However, essential operations can be provided even if this processing is omitted. In addition, if the substrate has a groove, coupling between the information tracks can be reduced by taking advantage of the radial variation of film deposition caused by irregularities on the substrate.

Interfaces between the magnetic layers are not necessarily required to be obvious. The recording medium may have a configuration in which the characteristics are gradually changed along the thickness.

What is claimed is:

1. A magneto-optical recording medium having a plurality of information tracks comprising:

a substrate, each of the information tracks having portions used for recording and reproducing information in the form of a magneto-optical signal and portions having pre-pits formed therein alternately arranged; and at least first, second and third magnetic layers laminated on the substrate, wherein the first magnetic layer has a domain wall coercivity smaller than that of the third magnetic layer, the second magnetic layer has a Curie temperature lower than that of the first magnetic layer and the third magnetic layer, and directions of magnetization of the third magnetic layer are aligned above the portions having the pre-pits and wherein regions in which the directions of magnetization are aligned are only areas in the portions having the pre-pits which immediately precede the portions used for recording and reproducing information in the form of an magneto-optical signal, and in the remaining areas in the portions having the pre-pits, the direction of magnetization of the third magnetic layer is polarized according to a predetermined signal pattern within a signal bandwidth used for recording and reproducing information.

2. A magneto-optical recording medium having a plurality of information tracks comprising:

a substrate, each of the information tracks having portions used for recording and reproducing information in the form of a magneto-optical signal and portions having pre-pits formed therein alternately arranged; and at least first, second and third magnetic layers laminated on the substrate, wherein the first magnetic layer has a domain wall coercivity smaller than that of the third magnetic layer, the second magnetic layer has a Curie temperature lower than that of the first magnetic layer and the third magnetic layer, and directions of magnetization of the third magnetic layer are aligned above the portions having the pre-pits and wherein a fourth magnetic layer is interposed between the first magnetic layer and the second magnetic layer, the fourth magnetic layer having a domain wall energy density higher than that of the first magnetic layer and a Curie temperature lower than that of the first magnetic layer and higher than that of the second magnetic layer.

* * * * *